United States Patent [19]

Roussin

[11] Patent Number: 4,716,339
[45] Date of Patent: Dec. 29, 1987

[54] SPLIT DRIFT RING FOR FOCUS DEFLECTION IN LIGHT VALVES

[75] Inventor: Alfred G. Roussin, Syracuse, N.Y.

[73] Assignee: General Electric Company, Princeton, N.J.

[21] Appl. No.: 883,214

[22] Filed: Jul. 8, 1986

[51] Int. Cl.$^4$ .............................................. H01J 29/46
[52] U.S. Cl. ..................... 315/15; 358/233; 358/62; 350/361
[58] Field of Search ................... 315/382, 14–16; 313/414, 449; 358/60, 230, 232, 233, 62; 350/361

[56] References Cited

U.S. PATENT DOCUMENTS

| | | | |
|---|---|---|---|
| 3,345,462 | 10/1967 | Good et al. | 358/233 |
| 3,538,249 | 11/1970 | Graser et al. | 358/233 |
| 3,746,911 | 7/1973 | Nathanson et al. | 358/233 |
| 4,065,644 | 12/1977 | Shinosky, Jr. | 315/372 |
| 4,110,791 | 8/1978 | Rosendahl | 358/232 |
| 4,533,216 | 8/1985 | Orser et al. | 358/233 |
| 4,543,508 | 9/1985 | Saito | 315/15 |

Primary Examiner—Theodore M. Blum
Assistant Examiner—David Cain
Attorney, Agent, or Firm—Eugene M. Whitacre; Vincent J. Coughlin, Jr.

[57] ABSTRACT

A light valve of the Schlieren dark field type is provided with a vacuum envelope containing an electron gun, a focus and deflection assembly and a rotating disk coated with a light modulating fluid on which an electron beam from the electron gun is scanned in a raster pattern. The rotating disk has a transparent electrode which serves as as electron beam landing electrode. Between the focus and deflection assembly and the rotating disk is a drift ring assembly comprising at least two axially separated segments. The drift ring segment closest to the focus and deflection assembly is operated at a voltage to generate, in combination with the focus and deflection assembly, an electrostatic lens which corrects distortions that originate from deflection fields applied to the focus and deflection assembly. The other drift ring segment is operated at a voltage different from that of the first drift ring segment such that the two drift rings interact to generate an electrostatic lens that controls the focus of the electron beam. The second drift ring and the electrode on the rotating disk interact to generate a third electrostatic lens to further control beam size to an essentially uniform value by further shaping of the locus of deflected field focus to closely approximate the planar surface of the control layer.

12 Claims, 17 Drawing Figures

ELECTRODES

FIG.10B

FIELDS

FIG.11A

ROUND APERTURE
NO VOLTAGE Δ

FIG.11B

ROUND WITH
68 b or c +V
TO DISK

FIG.11C

SQUARE WITH
68 b or c +V
TO DISK

FIG.11D

SQUARE ROTATED
45° +V

SPLIT DRIFT RING FOR FOCUS DEFLECTION IN LIGHT VALVES

BACKGROUND OF THE INVENTION

1. Field of the Invention

The present invention generally relates to improvements in light valve projection systems of the Schlieren dark field type and, more particularly, to improvements in the electron optics of the light valve to achieve a flatter field of the projected optical image, greater modulation efficiency of the raster scan signals, and less criticality in mechanical alignment of electro-optical parts and in applied voltages.

2. Description of the Prior Art

Light valve projection systems of the Schlieren dark field type have been in commercial use for many years and are capable of providing excellent performance. Typical prior art color projection systems of this type are shown in U.S. Pat. Nos. 3,290,436, 3,352,592 and 3,437,746, all of which were issued to W. E. Good et al. The principles of operation of this type of projection system are briefly described with reference to FIGS. 1, 2 and 3 of the drawings.

Figure 1:
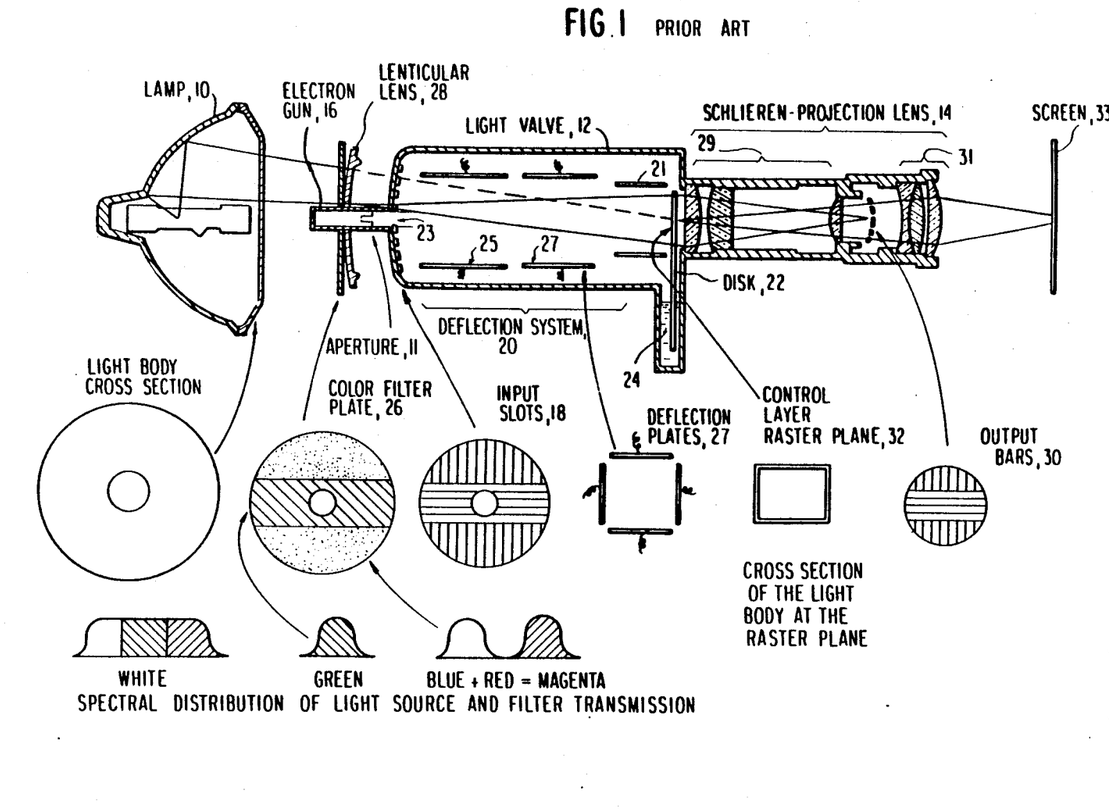
FIG. 1 is a simplified cross-sectional view showing the construction of a prior art light valve projection system.

With reference first to FIG. 1, there is schematically shown a single-gun television light valve assembly comprising a lamp 10, sealed light valve 12, and Schlieren projection lens 14. The sealed light valve 12 comprises a glass envelope which contains an electron gun 16, input slots 18, focus-deflection system 20, a control layer 32 on a rotating disk 22, and a fluid reservoir 24.

The electron gun 16 generates, from anode aperture 11, an electron beam which is used to "write" charge patterns on the control layer 32. These patterns create surface deformations in the layer and form light diffraction gratings. The electron beam is focused, deflected, and modulated by electrodes 23, 25, 27, and 21. The control layer surface deformations diffract and modulate the light rays passing through the layer 32 and disk 22.

The focus-deflection system 20 comprises three electrode sets each having four orthogonal electrodes, which form three electrode "boxes", referred to as boxes 23, 25 and 27, and a cylindrical electrode 21. The first of these, box 23, is arranged about the aperture in the input window and serves to center and allow pre-deflection of the electron beam. The next two boxes, boxes 25 and 27, have DC and AC voltages applied to them in a manner to achieve a uniformly focused electron beam image of aperture 11 which is scanned across the raster plane on control layer 32. This, in turn, permits the control layer fluid to be modulated uniformly by charge control to produce a uniformly colored projected image. following the focus-deflection boxes 25 and 27 is a drift ring 21 which serves, with a transparent electrode on disk 22, as an element of the final electron lens in the focus-deflection system 20.

Specific examples of light modulating fluids are disclosed in U.S. Pat. No. 3,288,927 to Ralph W. Plump, U.S. Pat. Nos. 3,317,664 and 3,317,665 both to Edward F. Perlowski, Jr., U.S. Pat. No. 3,541,992 to Carlyle S. Herrick et al, and U.S. Pat. No. 3,761,616 issued to C. E. Timberlake. These fluids may include additives as taught by U.S. Pat. Nos. 3,764,549 and 3,928,394 to David A. Orser. In general, the control layer or light modulating fluid is a very special chemical compound, modified with special additives, having the electromechanical and visco-elastic properties needed to produce effective control layer properties in the electron beam addressed light valve.

The basic light collection system includes an arc lamp 10, which may be a Xenon lamp, the arc of which is located at the focus of a reflector system, which may be a simple ellipsoidal reflector, as shown, or a compound reflector, as disclosed for example in U.S. Pat. No. 4,305,099 to Thomas T. True et al. The light from the arc is reflected from the reflector through a pair of spaced lens plates having corresponding pluralities of rectangular lenticules arranged in horizontal rows and vertical columns. The first lens plate is shown in FIG. 1 at 28 and the second lens plate is formed on the light input surface of the glass envelope of the light valve 12. The light from the lamp 10 is projected through a color filter plate 26 and the lenticular lens 28 before entering the light valve 12.

The interior surface of the glass envelope of the light valve 12 carries the input light mask in the form of slots 18 which, for example, may be applied by vapor deposition. The input slots 18 are a series of transparent slots and alternating opaque bars in a pattern generally as indicated in FIG. 1. Rays of filtered light from the lamp 10 pass into the light valve 12 through these transparent slots. The lenslets of the lenticular lens 28 and the corresponding lenslets, formed on the light input surface of the glass envelope of the light valve 12, form condensing lens pairs which first focus spots of filtered light onto the slots of the light mask and then re-image the light rays onto the control layer raster plane 32. With this arrangement, efficient utilization is made of light from the arc lamp, and uniform distribution of light is produced, in a rectangular pattern, on the light modulating medium or control layer 32.

The Schlieren projection lens 14 includes Schlieren lens elements 29, output color selection bars 30 and a projection lens system 31. The output selection bars 30 are the complement of the input slots 18. That is, on the output bar plate, the bars are optically aligned with the slots of the input slots 18 so that, in the absence of a diffraction of light passing through the control layer 32, light rays are focused and terminated on the bars of the output bar plate. This creates a "dark field" condition, i.e., no light is transmitted in the absence of a modulating signal superimposed on the raster scanning signals applied to the horizontal and vertical deflection plates of the deflection system 20. It should be noted, however, that the electron beam which scans the raster and provides charge to the control layer is a constant current electron beam, there being no modulation of the intensity of the beam produced by the electon gun 16 (other than during the horizontal and vertical retrace intervals when the beam is off).

The lower half of FIG. 1 shows the cross sections of the light body and light valve components. The spectral diagrams at the bottom indicate how the light is prefiltered before entering the light valve.

Figures 2, 3:
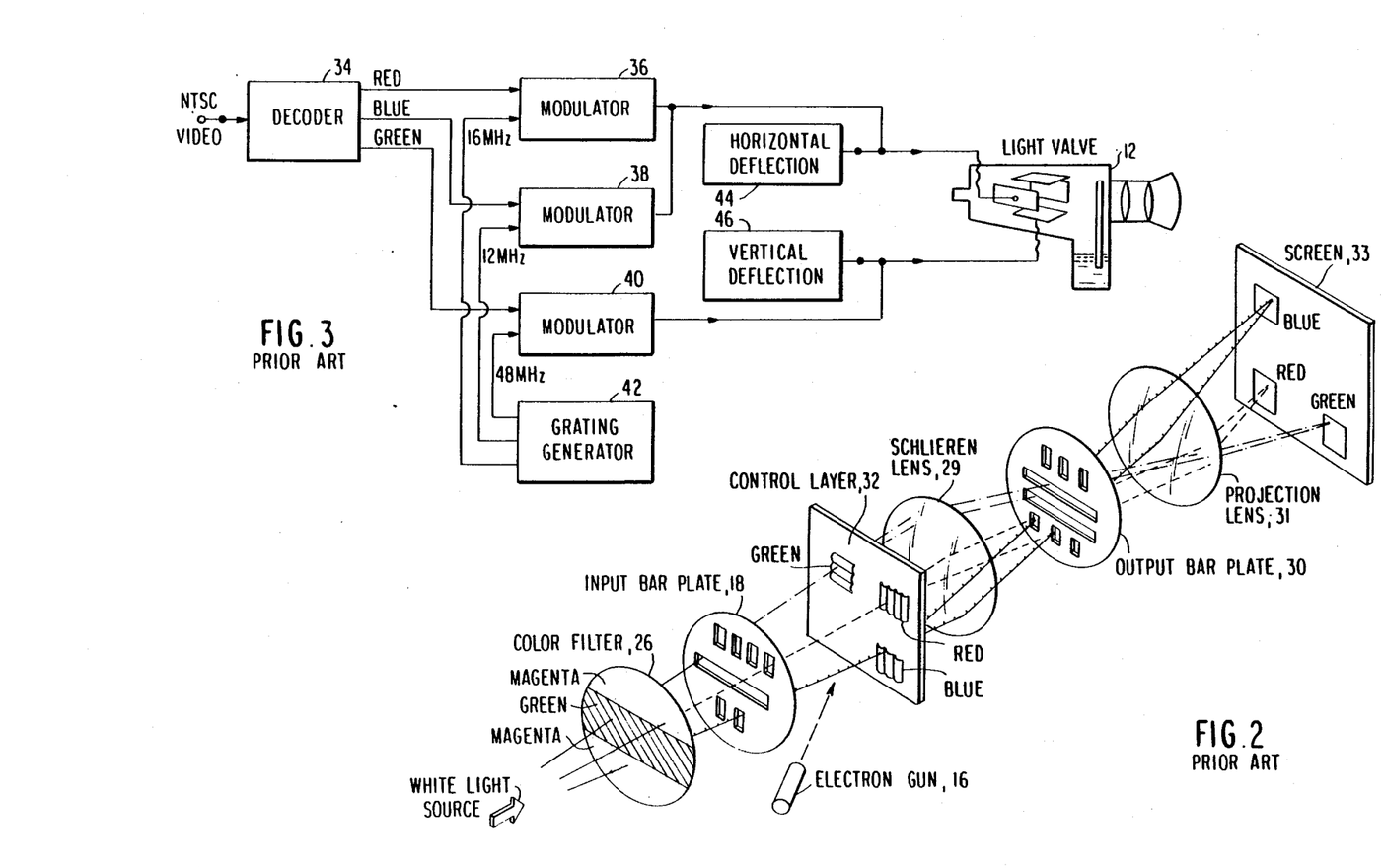
FIG. 2 is a simplified perspective view illustrating the principles of operation of the prior art light valve projection system.
FIG. 3 is a block diagram showing the basic circuitry of a modulated deflection system of the prior art light valve projection system.

FIG. 2 is a simplified light valve diagram showing the color selection action of the three basic gratings. The control layer 32 which is supported by the rotating disk 22 (shown in FIG. 1) is illustrated as having three different diffraction gratings for red, green and blue light components. These diffraction gratings may be written individually or simultaneously and normally are actually superimposed but, for purposes of illustration only, they are shown in FIG. 2 as separated on the control layer 32.

In the light valve projection system shown in FIGS. 1 and 2, green light is passed through the horizontal slots of the input bar plate 18 and is controlled by diffraction gratings formed by modulating the vertical dimension of the scanned raster lines on the control layer 32. This is done by controlling the amplitude of a high frequency carrier applied to the vertical deflection plates as modulated by the green video signal as shown in FIG. 3. Magenta (red and blue) light is passed through the vertical slots of the input bar plate 18 and is controlled by charge generated diffraction gratings created at right angles to the raster lines by velocity modulating the electron spot as it is scanned in the horizontal direction. In the example shown in FIG. 3, this is done by applying a 16 MHz (12 MHz for blue) signal to the horizontal deflection plates and modulating it with the red video signal as shown in FIG. 3. The grooves created in the control layer 32 have the proper spacing to diffract the red portion of the spectrum through the vertical output slots in plate 30 while the blue portion is blocked. (When the 12 MHz carrier is used, the blue light is passed by the vertical slots in plate 30 and the red light is blocked.)

Thus, three simultaneous and superimposed primary color pictures can be written with the same electron beam and projected to the screen 33 as a completely registered full color picture. Colors are created by writing miniature diffraction gratings within each picture element on the fluid surface by manipulating the single scanning electron beam. These gratings diffract the transmitted light rays away from their terminations at the output bars where they are spatially filtered to let the desired color reach the screen. The amount of light diffracted is dependent on the depth of the gratings formed in the control layer. This technique permits a full color television picture to be written on a single control layer with no need for further registration.

FIG. 3 shows in block diagram form the basic light valve projector circuitry. A composite video signal is supplied to the input of a decoder 34 which provides at its output red, blue and green video signals. These signals are respectively applied to modulators 36, 38 and 40. A grating generator 42 supplies carrier signals which, in the case illustrated, have frequencies of 16 MHz and 12 MHz, respectively, to modulators 36 and 38 and a signal having a frequency of 48 MHz to modulator 40. The outputs of the red and blue modulators 36 and 38 are combined and superimposed on the horizontal deflection signal from the horizontal deflection signal generator 44. The output of the green modulator 40 is superimposed on the vertical deflection signal from the vertical deflection generator 46.

The basic Schlieren dark field light valve projector as schematically illustrated in FIGS. 1, 2 and 3 has evolved over a period of years to be a highly efficient projector producing excellent quality pictures of good color balance and high resolution. There is, however, an ongoing effort to improve and optimize the design and operation of the projector. Among the more critical design considerations is the electron optics of the light valve. The electron optics are, as may be appreciated from the foregoing discussion, quite complex and dynamically changing as a result of the varying deflection voltages. It has been found that the uniformity of picture performance is critically dependent on very exact alignment of the light valve's focusing and deflecting electrode system and with critically close control of applied voltages, sweep balance and dynamic pre-deflection. Even with the aforementioned concerns under careful control, prior art electron optics have required operational compromises to be made in balancing the many variables of electrical and mechanical properties of the light valve system for best performance. Accordingly, there is a continuing need to optimize and improve the uniformity of the modulated color fields of the projected images and to decrease the sensitivity of the mechanical assembly and alignment of the electron optics electrode system.

SUMMARY OF THE INVENTION

It is an object of this invention to provide improvements in the design and manufacture of light valve projection systems of the Schlieren dark field type.

It is another more specific object of the invention to provide an improvement in the electron optics of the light valve which improves the color uniformity of the modulated projected optical fields, sometimes referred to as "flatness" of the projected optical fields.

It is a further object of the present invention to provide an improvement in the electron optics which minimizes alignment criticality and minimizes applied voltage criticality in light valves of the Schlieren dark field type.

According to the invention, the drift ring between the last set of deflection plates and the target area is split into at least two axial units. The drift ring segment closest to the last set of deflection plates is operated at a voltage to optimize the flat fields of the projected optical image. The other drift ring segment is operated at a voltage to optimize the magnification for optimum modulation efficiency for the particular disk voltage selected. A further improvement in performance is realized by shaping the aperture in the second drift ring to create final beam focusing field components which compensate for raster deflection distortions of the basic deflection structure.

BRIEF DESCRIPTION OF THE DRAWINGS

The foregoing and other objects, aspects and advantages of the invention will be better understood from the following detailed description with reference to the drawings, in which.

DETAILED DESCRIPTION OF THE PREFERRED EMBODIMENT OF THE INVENTION

Figure 4:
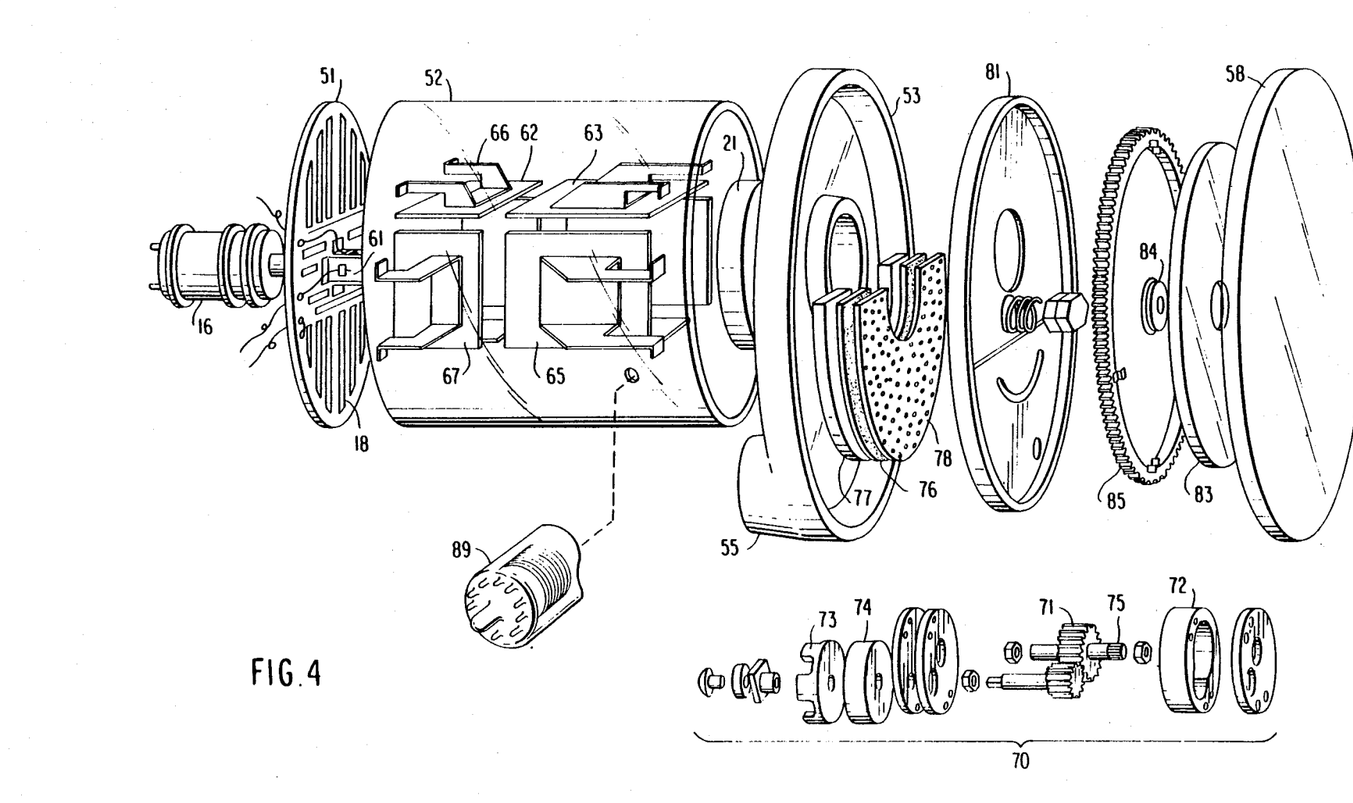
FIG. 4 is an exploded perspective view of major elements of a new generation of light valves which embody the invention.

In the drawings, like reference numerals used in the several figures indicate the same or corresponding components. Referring again to the drawings, and more particularly to FIG. 4, there is shown an exploded view of the internal vacuum components of the new generation Schlieren dark field light valves. The vacuum enclosure comprises an input window 51, a glass cylinder 52, a rear housing 53 which has a molded recess 55 for receiving a pump assembly 70, and a face plate 58. The electron gun assembly 16 is attached to a central aperture of the input window 51, and the input slots or bar plate 18 are formed on the interior surface of the input window 51, functionally similar to the earlier light valves of this type.

Figure 5:
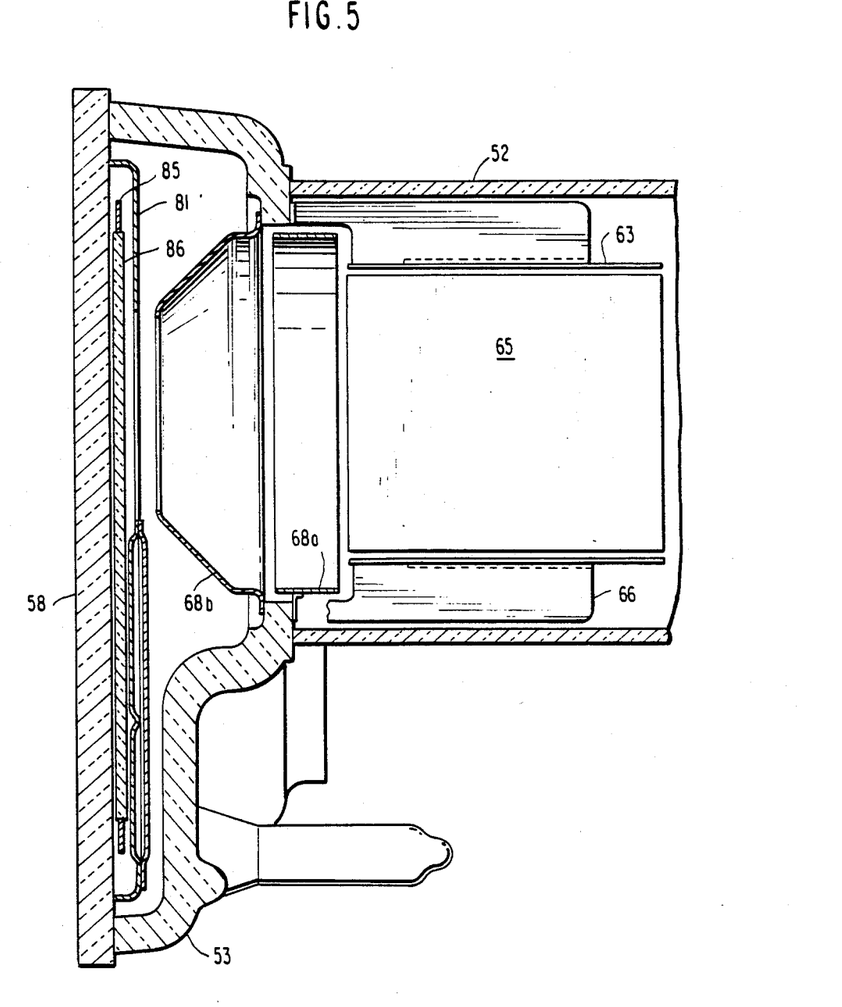
FIG. 5 is a cross-sectional view showing a portion of the light valve and, in particular, the split drift ring structure according to the present invention.

The focus and deflection assembly comprises three sets of electrodes. One set of four electrodes 61, comprising a pair of horizontal plates and a pair of vertical plates, is attached to the input window 51 about its central aperture. A pair of vertical deflection plates 62 and a pair of horizontal deflection plates 67 located within the cylinder 52 form the second set. The third set is comprised of the vertical deflection plates 63 and the horizontal deflection plates 65. As shown in FIG. 4, the deflection plates 62, 63, 65, and 67 are supported within the cylinder 52 by means of brackets 66 which also provide the electrical connections to the deflection plates. Beyond the deflection plates 63 and 65 and within the rear housing 53 is a cylindrical drift ring 68 which, with a transparent electrode 86 (FIG. 5) on disk 83, completes the focus-deflection system. The transparent electrode 86 is the beam landing electrode. As will be described in more detail and as illustrated in FIG. 5, this cylindrical drift ring 68 is axially split into two sections and operated at different voltages to optimize the performance of the light valve.

A gear pump assembly, generally indicated at 70, is located within recess 55 of the rear housing 53. The gear pump comprises gears 71 within a housing 72 driven by a magnet 73. The magnet 73 is coupled to a rotating magnet driven by an electric motor (not shown) axially aligned with the pump 70 on the exterior rear face of the recess 55 that houses the pump. An axial shield 74 is provided for the magnet 73 so that its magnetic field does not affect the electron beam. Other magnetic shielding is provided within the light valve projection system to prevent the electron beam from being affected by magnetic fields at the projector or due to the earth's magnetic field.

The rear housing 53, including the recess 55 which houses the pump assembly 70, and the face plate 58 generally define the reservoir 24 (schematically illustrated in FIG. 1) which contains the fluid. The gear pump 70 is located in that reservoir and operates to pump the fluid through a filter 76. The filter 76 is sandwiched between a filter housing 77 and a perforated panel 78, and this assembly is secured to the lower rear face of a baffle 81. The baffle 81 is a generally circular disk with a forwardly projecting flange which surrounds the rotating disk 83. The disk 83 is supported for rotation by a bearing 84 through which projects a pin mounted in the center of baffle 81. A ring gear 85 is attached to the peripheral edge of the disk 83 and is driven by a pinion gear 75 that projects from the gear pump 70.

Attached to the side of the cylinder 52 is a vacuum maintenance device 89, which collects gaseous materials remaining in the envelope after it is sealed and which are generated as a product of the operation of the light valve.

Referring now to FIG. 5, the drift ring 68 shown only generally in FIG. 4 is shown as comprising two parts 68a and 68b in FIG. 5. Drift ring segment 68a closest to the focus deflection plates 63 and 65 is cylindrical and supported on one side of the rear housing 53. Drift ring segment 68b closest to the baffle 81 and the rotating disc 83 has a generally truncated conical shape and is supported on the opposite side of the rear housing 53.

Figure 6A:
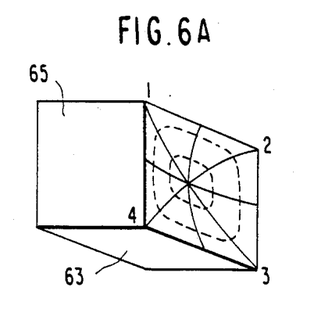
FIG. 6A is an isometric view of a portion of the focus deflection system box electrode pairs 63 and 65 showing equipotential field lines from the beam output or electrode 86 end, for the on-axis case where the box electrodes are at the same d.c. potential.

When the essentially square deflection box electrodes 63–65 are adjacent to other conducting surfaces, such as electrodes 68a and 68b and disk electrode 86, operating at different potentials than the electrode box 63–65, the equipotential lines within the electrode box 63–65 will form as shown in FIG. 6A. The loci of these equipotential lines become essential square as the distance off axis increases. As the electron beam passes through the electrode box 63–65 and electron lenses R, S and T shown in FIG. 7, it follows the well known laws of electron physics with the beam magnification and focusing being dependent upon the strength, location and shape of the electron lenses being traversed. In the case of the light valve shown in FIG. 4, it should be understood that the electrodes shown at 61 and 62–67 also form electron lenses which act upon the beam prior to its entry into the region of lenses R, S and T.

The on-axis, or undeflected electron beam, is easily brought to focus at electrode 86 by adjusting the axial positions and the voltages applied to the axially symmetrical electrodes. In the light valve, the electron beam is shaped at the rectangular object aperture in anode 11, and the shaped beam is then imaged, electron optically, as a focused, high current density, rectangular pattern to the control layer 32 on electrode 86.

In order to "write" diffraction gratings which allow one to form a picture in response to video information supplied to the light valve type video projector, it is necessary to deflect the electron beam over a raster area by applying differential voltages to electrode pairs 63-65. While these beam deflection voltages may be applied symmetrically, allowing on-axis potential of the electrode box to remain constant, the off-axis deflection of the beam causes it to pass through the electron lenses in regions containing magnification and focus distorting fields caused by the sweep scanning voltages. These result in changes in the imaged beam size, shape and locus of focus of the deflected beam.

Figure 6B:
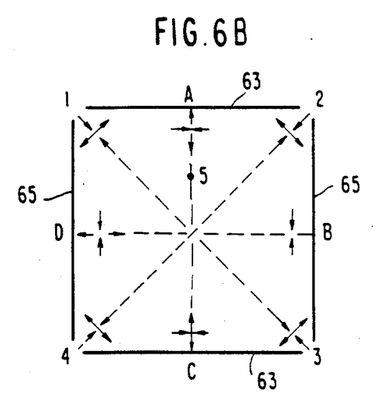
FIG. 6B is a plan view depicting the deflection astigmatic forces on the electron beam, within the 63–65 electrode box, when the beam is deflected off-axis.

FIG. 6B illustrates some of the elements of the forces which lead to the "astigmatism" of the off-axis deflected beam. Consider the case where the on-axis, focused beam condition calls for electrode pairs 63 and 65 to be at a potential of +100 volts. The beam travels on axis through the electrode box and the following electron lens sections(s) and is focused on the control layer 32 and electrode 86. If a beam deflection toward the electrode A in FIG. 6B is required, a symmetrical differential potential on electrodes A and C is required. A symmetrical differential voltage of, for example, +500 and −500 volts may be applied so the electrode A becomes +600 volts and the electrode C becomes −400 volts, while electrodes B and D remain at +100 volts. The electron beam will be deflected toward electrode A, remaining undeflected along the B-D axis and emerging from the electrode box 63-65 at, for example, point 5 in FIG. 6B. The off-axis deflection voltages change the lens shape and strength of the fields distributed within the electrode box resulting in tangential and radial forces being applied to the beam, the effect of which is to spread the focused beam in the A-C direction and compress it in the B-D direction. This is illustrated by the force vectors shown along the A-C deflection line. A similar result occurs if the beam is deflected along the B-D axis; however, the spreading and compression forces are now rotated 90 degrees as illustrated. When it is necessary to position the electron beam in some other place, typically anywhere in the raster scanned area, the electrode voltages required to cause the scanning also cause a change in the amplitude and direction of the effective defocussing forces on the beam as depicted by the vectors shown in FIG. 6B. The greater the beam deflection, the greater the distortion of the lens and the greater the resultant change in the imaged beam size and shape at the control layer electrode on which the beam terminates.

Since the amplitude of the diffraction gratings formed on the control layer 32 are directly related to the size of the writing beam, defocusing of the beam, caused by the deflection voltages used for the raster scanning process, causes a non-uniform light transfer to occur. In the color light valve system shown in FIGS. 1 and 2, orthogonal diffraction gratings are used to control and select the magenta (red and blue) and the green light transfer. Since the red or blue light components transferred to the screen depend on the horizontal dimensions of the imaged beam on the control layer, changes in this beam dimension due to scanning distortion forces will cause differing amounts of red or blue light to be projected in different areas of the raster. In like fashion, the green dark field and the green light transferred to the screen in response to the green video signal are dependent on the vertical beam size which in turn varies under the effect of the scanning field forces applied to the beam in the vertical direction. The combined effect of the scanning fields therefore cause significant changes in the beam size over the scanned raster area and these, in turn, cause significant changes in the uniformity of the individual and combined colored field writing efficiencies in the red, blue and green fields.

Figure 7:
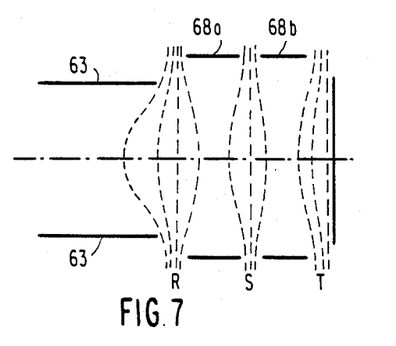
FIG. 7 is a cross-sectional view, through the center line of the light valve, depicting the generalized electron lenses R, S, and T, formed by the electrodes 63–65 and drift ring 68a, electrodes 68a and 68b, and electrode 68b to electrode 86, for the non-deflected beam case.
Figure 8:
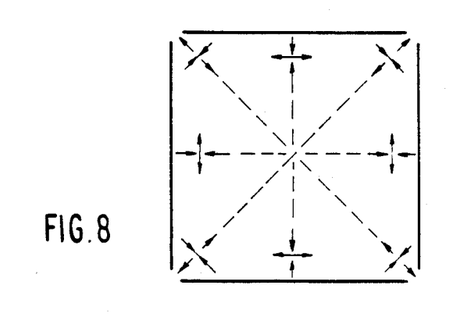
FIG. 8 is a plan view depicting the static off-axis focusing forces, shown as force vectors, for a typical correcting field created by the geometry of the electrode elements 63–65 and 68a and with differential voltages applied between the electrode pairs.

In order to reduce these undesirable distortions, prior art light valves used a cylindrical ring electrode similar to that shown in FIG. 4 as electrode 21. That electrode, which could be considered electrically as a one piece combination of electrodes 68a and 68b, operated at the same potential as electrode 86. In effect this electrode, in combination with the deflection box electrodes 63-65, formed electron lens R shown in FIG. 7. It has an effect on the electron beam of adding beam distortion vectors as depicted in FIG. 8. Notice that these beam force vector directions are opposite to those resulting from the distortion vectors introduced by the deflection voltages within the electrode box 63-65 as shown in FIG. 6B. Although the prior art electrode arrangement served to correct some of the distortions introduced in the electrode box 63-65, it was not possible, simultaneously, to balance the counteracting beam forces and maintain the magnification of the beam image at a uniform value across the entire scanned raster to obtain a constant beam size and thus achieve a uniform transfer of light, or "flat field" condition for the red, blue and green modulated light. Development work showed that the fields between the square box electrodes 63-65 and a cylindrical electrode could produce a measure of correction for the off-axis beam distortions and showed that the diameter and axial length of the electrode, combined with the differential voltages between the box and the cylinder, created field conditions which improved the "writing" uniformity substantially. The nature of these prior art constructions was such as to create an extreme requirement for electrode geometry control and balance as well as critical electrical sweep and focusing voltage controls.

By this invention, I have determined that one may achieve a great improvement in the flat field performance of the light valve by optimizing the distortion correcting fields and separately managing the beam focus. This can be accomplished through the use of at least two axially deployed cylindrical electrodes. The first cylindrical electrode creates at lens R shown in FIG. 7 distortion correcting tangential and radial force vectors which originate from deflection fields applied in the box electrodes. The second cylindrical electrode, operating at a different voltage, cooperates with the first cylindrical electrode to form an electron lens S that controls the electron beam focus. Yet a third electron lens T is formed between the second cylindrical electrode and the control layer electrode 86 which further controls the beam size to an essentially uniform value by shaping the locus of the deflected field focus to closely approximate the planar surface of the control layer. These three lenses are shown in FIG. 7. Considering the two axial electrodes, the first electrode 68a interacts with the box electrodes 63-65 (only electrodes 63 are shown in FIG. 7) to form the lens R. Electrodes 68a and 68b interact with each other to form lens S. Electrode 68b and the control layer or disk electrode 86 interact to form lens T. The strength and correction forces achieved by each of these lenses is primarily dependent upon the length, diameter and voltage differences between the adjacent electrodes.

I have determined that the ratio of the diameter of the cylindrical electrode 68a to the spacing between parallel plates of the electrode box 63-65 is critical to achieve the most effective beam distortion corrective forces to maintain the proper magnification of the imaged beam aperture. The voltage between electrodes 68a and 68b can be adjusted for a give potential on electrode 86 to achieve the desired beam magnification and flat locus of focus on the control layer 32.

Figure 9A:
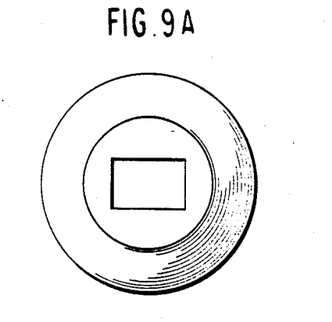
FIGS. 9A and 9B are plan and cross-sectional views, respectively, of the second drift ring having a preferred aperture and which, with the disk electrode, forms an electron lens.
Figure 9B:
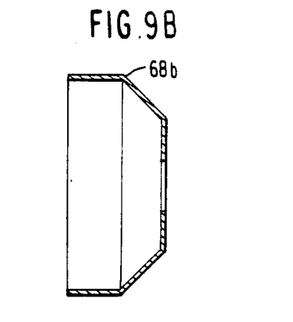

A further improvement in distortion corrections can be achieved by forming electrode 68b into an apertured dish-shaped electrode as shown in FIGS. 9A and 9B. This shape strengthens the field between disk electrode 86 and electrode 68b (for a given voltage difference) and also establishes a further means for correcting scanned raster distortion in addition to its primary beam focusing function. Specifically, the size and shape of the aperture of drift ring segment 68b affects the shape of the terminating field to disk electrode 86 and thus the beam landing position and focus. As will be described more fully hereinafter, the aperture shape can be used to trim the raster linearity errors and retain uniform flat field performance of the light valve. Another advantage of the split drift ring structure according to the invention is that by application of different voltages between drift ring segments 68a and 68b and the disk electrode 86, disk electrode 86 can be made to operate at relatively lower voltages, in the range of approximately +3000 to +5800 volts, and this lower landing voltage is desirable to reduce fluid damage by the electron beam. Further, when electrode 68b is at a higher voltage than disk electrode 86 (the normal case), secondary and reflected electrons from the control fluid layer 32 are collected by drift ring 68b, thus preventing them from falling back on the control layer and causing undesired charge distribution.

In one embodiment of this invention in which the electrode 86 operates in the range of +5000 to +7200 volts and the electrode box 63-65 operates in the range of 0 to +100 volts, I have determined that electrode 68a should be operated at +4600 to +4800 volts and electrode 68b at +6000 volts. These values optimize performance when the diameters of electrodes 68a and 68b are 2.8 inches, the lengths of the electrodes is 0.5 inches, and the interelectrode spacing for the electrode box 63-65 is 2.4 inches. The spacing between the electrode box 63-65 and the cylindrical electrode 68a is 0.1 inch. Tests have indicated that the critical ratio of cylindrical electrode diameter to the spacing between parallel plates of the box electrodes is from a minimum of 1.1 to a maximum of 1.25. Electrode dimensional ratios between the square box and the first cylindrical electrode in this range permit proper correction for off-axis tangential and radial magnification distortion of the electron beam. The axial interelectrode spacings and operating potentials are determined primarily by the operating voltage requirements of electrode 86. The symmetrical, generally spherical lenses S and T in FIG. 7 allow the nearly independent adjustment of lens focus to achieve the needed imaged beam characteristics over the scanned raster area of the control layer.

Figure 10A:
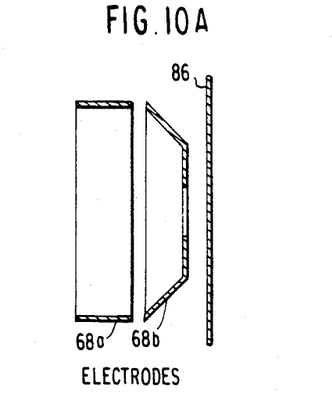
FIG. 10A is a cross-sectional view of the two drift rings of one preferred embodiment of the invention showing the relative spacing between the second drift ring and the disk electrode.
Figure 10B:
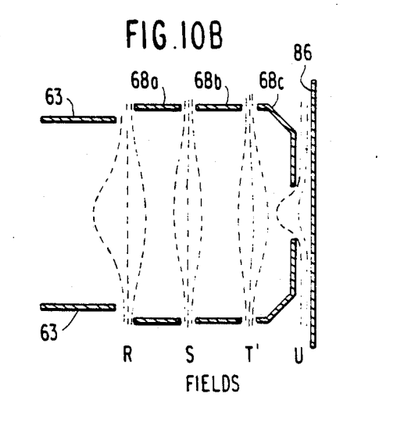
FIG. 10B is a cross-sectional view of an alternative three drift ring embodiment of the invention showing the electron lenses formed by these drift rings and the deflection and disk electrodes.

In another embodiment of the invention, the electrode 68b may be divided into two axial segments as shown in FIGS. 10A and 10B. In the embodiment shown in FIG. 10B, an electron lens T' will be established between drift ring segments 68b and 68c, and a new electron lens U will be established between drift ring segment 68c and the disk electrode 86. One advantage of this embodiment is that both the distortion correcting field strength and the focus fields S and T' are essentially independent of each other. Another advantage is that disk electrode 86 may be operated at a desirably lower beam landing voltage when lens T' is used in conjunction with lenses S and U. For example, a further reduction of disk voltage at electrode 86 may be accomplished by operating the first drift ring 68a at +4600 to +4800 volts, the second drift ring 68b a +6000 volts, and the third drift ring 68c at 150 to 250 volts more positive than disk electrode 86, which may operate at from +2000 to +5000 volts.

Figure 11A:
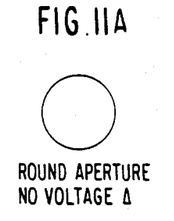
FIGS. 11A to 11D are plan views illustrating several possible combinations of aperture geometry and voltage differential for the second or last drift ring.
Figure 11B:
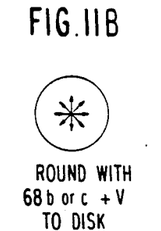
Figure 11C:
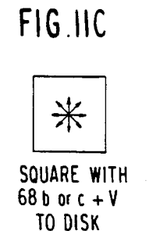
Figure 11D:
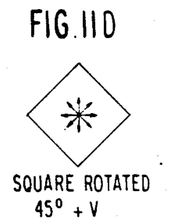

In both the embodiment using two drift ring segments and the embodiment using three drift ring segments, the final drift ring, 68b or 68c, may have an aperture which is rectangular, with a shape essentially corresponding to the scanned raster shape, or circular and centered on the raster center. FIGS. 11A to 11D show the effects of vector forces created by field U, for various combinations of circular or rectangular apertures in drift ring segments 68b or 68c and voltage differentials with respect to the disk electrode 86. The magnitude of these vectors is proportional to the voltage difference between the disk electrode 86 and the apertured drift ring 68b or 68c. The direction of the vectors shows the way they will influence the raster scanned beam and is dependent upon the polarity of the field U. The normal case is for drift rings 68b or 68c to be positive with respect to disk electrode 86, and the vectors are shown accordingly. The light valve may be operated with 0 volts differential and no corrective field forces or slightly negative differential voltage which would apply forces of opposite direction to those illustrated. A combination of circular and rectangular aperture geometry may be used to optimize the electrostatic forces of field U for best linearity and associated electron beam writing performance. For example, FIG. 11A shows the case of a circular aperture with 0 voltage differential between the drift ring segment 68b or 68c and the disk electrode 86. In this case, the field U is zero and raster size and shape is not changed. In FIG. 11B, a circular aperture with a positive voltage differential between the drift ring segment 68b or 68c and the disk electrode 86 is illustrated. In this case, the shape of the raster remains the same, but the size of the raster is increased. FIG. 11C shows the case of a square aperture with a positive voltage differential between the drift ring segment 68b or 68c and the disk electrode 86. This produces a barrel distortion to the raster and would be useful for correcting a pincushion distortion in the raster. By rotating the square aperture 45 degrees as shown in FIG. 11D, a pinchusion distortion can be produced which would be useful for correcting a barrel distortion in the raster. Other suitably sized and shaped apertures and voltage differentials may be used to compensate for deflection distortions of the basic deflection structure of the light valve. By incorporating the aperture in a third drift ring 68c, a greater degree of flexibility is provided for independently setting of magnification, flat fields, landing voltage, and deflection geometric distortion correction.

It should be recognized that electrode sizes and voltages may be scaled to satisfy other operating conditions or applications where an electron beam, being acted upon by fields created by a set of essentially square deflection box electrodes, can be effectively controlled in magnification and focus, by using electrostatic fields between the deflection box and at least two additional cylindrical electrodes deployed axially between the deflection box electrodes and the beam receiving electrode. Thus, while the invention has been described and illustrated in terms of various preferred embodiments, those skilled in the art will recognize that the invention can be practiced with modifications and alterations within the spirit and scope of the appended claims.

Having thus described my invention, what I claim as novel and desire to secure by Letters Patent is as follows:

1. An improved electrostatic electron optical system for generating an electron beam and imaging an electron object formed by an aperture having a rectangular cross-section and sweeping said beam over a scanned raster area while maintaining the magnification of the horizontal and vertical image dimensions, and focus surface over the entire scanned area comprising:

a focus deflection electrode assembly of rectangular cross-section having two pairs of parallel plates;

at least two substantially symmetrical, cylindrical electrodes in spaced apart relation along the axis of said focus and deflection electrode assembly; and a beam landing electrode, said at least two cylindrical electrodes being operated at different voltages to produce a plurality of electrostatic lense which provide off-axis deflection defocusing correction, primary focusing and magnification control between the focus and deflection electrode assembly and the first of the at least two cylindrical electrodes, separate symmetrical electron beam secondary focusing control between the first and the second of the at least two cylindrical electrodes, and secondary control over electron beam magnification between the second cylindrical electrode and the beam landing electrode.

2. The improved electrostatic electron optical system as recited in claim 1 wherein the deflection electrode assembly has a square cross-section and the ratio of cylindrical electrode diameter to the spacing between parallel plates of the deflection electrode assembly is within the range of a minimum of 1.1 to a maximum of 1.25.

3. The improved electrostatic electron optical system as recited in claim 2 wherein the cylindrical electrode closest to said beam landing electrode is generally dish-shaped having a larger diameter which decreases to a smaller diameter along an axial direction approaching said beam landing electrode and further has an aperture of geometrical shape to correct distortions in the beam deflection.

4. The improved electrostatic electron optical system as recited in claim 3 wherein said aperture is a circle.

5. The improved electrostatic electron optical system as recited in claim 3 wherein said aperture is a rectangle.

6. The improved electrostatic electron optical system as recited in claim 3 wherein said aperture is a square.

7. The improved electrostatic electron optical system as recited in claim 6 wherein said square is axially aligned with said raster area.

8. The improved electrostatic electron optical system as recited in claim 6 wherein said square is rotated 45 degrees with respect to an axial alignment with said raster area.

9. An improved Schlieren dark field light valve comprising:

a vacuum envelope having an input window, a focus and deflection cylinder, a rear housing, and a face plate including an output window, a portion of the space between said rear housing and said face plate defining a reservoir;

an electron gun positioned in a central aperture of said input window;

a focus and deflection assembly supported within said focus deflection cylinder, said focus and deflection assembly having two pairs of parallel plates;

a rotating disk partially projecting into said reservoir and having an electrode on a surface closest to said electron gun;

a fluid in said reservoir, said fluid coating said rotating disk, said electron gun generating an electron beam which is deflected by voltages applied to said focus and deflection assembly to scan a raster on the fluid coating said rotating disk; and a split drift ring assembly between said focus and deflection assembly and said rotating disk, said assembly including at least a first drift ring segment adjacent said focus and deflection assembly operated at a first voltage and a second drift ring segment axially separated from said first drift ring segment adjacent said rotating disk and operated at a second voltage, said focus and deflection assembly in combination with said first drift ring interacting to form a first electrostatic lens to correct electron beam distortions which originate from deflection fields applied to said focus and deflection assembly, said first and second drift rings interacting to form a second electrostatic lens to control electron beam focus, and said second drift ring in combination with said electrode on said rotating disk forming at least a third electrostatic lens to control electron beam size.

10. An improved Schlieren dark field light valve as recited in claim 9 wherein the ratio of the diameter of said first drift ring to the spacing between parallel plates of the focus and deflection electrode assembly is in the range of a minimum of 1.1 to a maximum of 1.25.

11. An improved Schlieren dark field light valve as recited in claim 10 wherein said split drift ring assembly includes a third drift ring segment between said second drift ring segment and said rotating disk and having an aperture with a geometric shape for further correcting electron beam distortions.

12. An improved Schlieren dark field light valve as recited in claim 10 wherein said split drift ring assembly is operated at voltage potentials that allow a lower landing voltage for said electrode on said rotating disk in order to reduce damage to said fluid on said rotating disk by the electron beam.

* * * * *